Figure 2A:
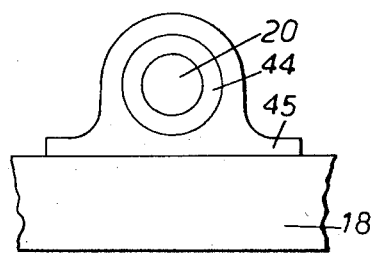

United States Patent
King

[11] 3,768,584
[45] Oct. 30, 1973

[54] VEHICLE SUSPENSION
[75] Inventor: Charles Spencer King, Cubbington, near Leamington, England
[73] Assignee: The Standard Triumph Motor Company Limited, Coventry, England
[22] Filed: July 15, 1971
[21] Appl. No.: 165,776

[52] U.S. Cl. .............................. 180/73 R, 267/15 R
[51] Int. Cl. ............................................ B60k 17/32
[58] Field of Search ..................... 180/73 R, 73 TL, 180/73 TT, 73 C, 73 D, 71; 267/15 R, 15 A; 280/124 R

[56] References Cited
UNITED STATES PATENTS

| 3,332,702 | 7/1967 | Rosenkrands..................... 267/15 R |
| 3,419,101 | 12/1968 | Allison............................. 180/73 R |
| 3,193,303 | 7/1965 | Allison et al.................. 180/73 R X |
| 2,907,578 | 10/1959 | Taber............................. 180/73 R X |
| 3,603,422 | 9/1971 | Cordiano ........................ 180/73 TL |
| 3,171,642 | 3/1965 | Allison........................ 180/73 TL X |
| 3,583,725 | 6/1971 | Fry................................. 280/124 R |
| 2,929,639 | 3/1960 | Barenyl et al.............. 280/124 R X |

Primary Examiner—Kenneth H. Betts
Assistant Examiner—John P. Silverstrim
Attorney—Harold T. Stowell et al.

[57] ABSTRACT

A vehicle suspension for a beam axle locates the axle by a pair of trailing arms which have a bridge member extending between the arms parallel to, and forwardly of, the axle. The differential housing of the axle has a rigid projection which is connected to the bridge member by means controlling the degree of movement of the axle about the longitudinal axis of the vehicle.

9 Claims, 3 Drawing Figures

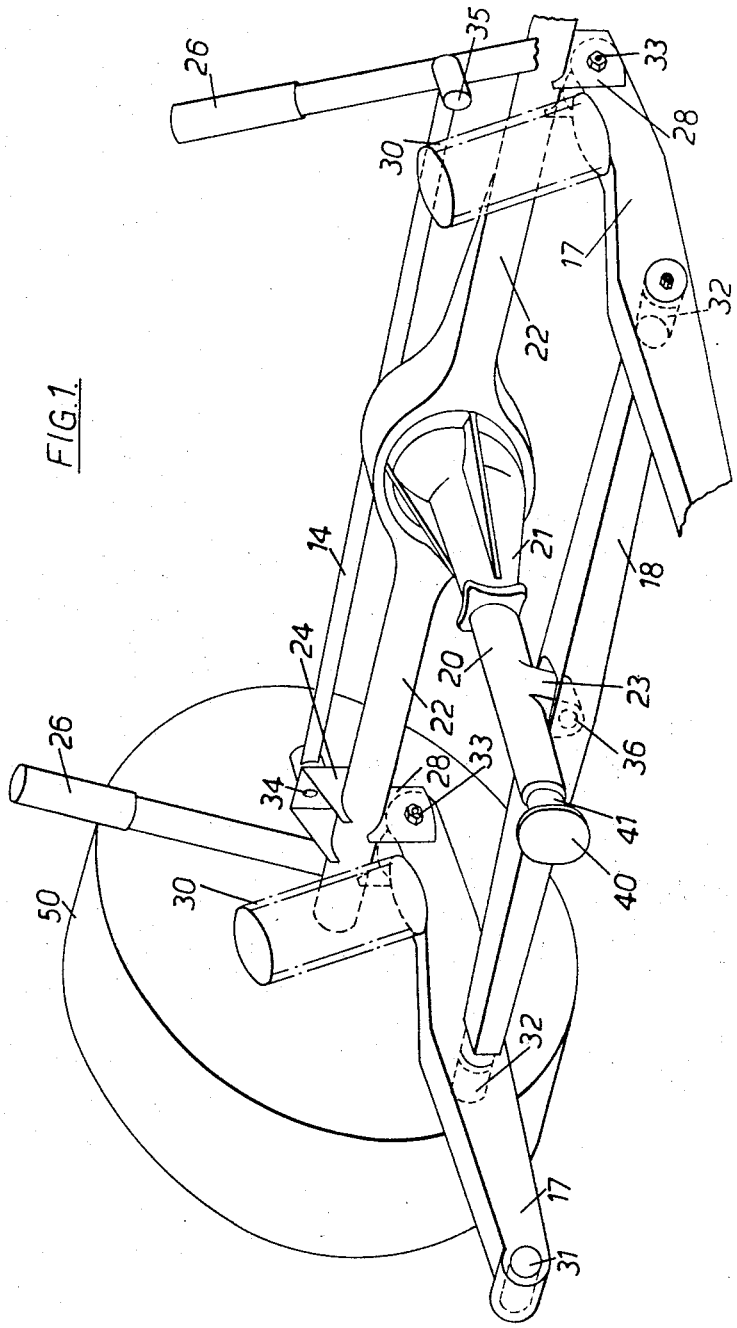

3,768,584

VEHICLE SUSPENSION

This invention relates to vehicle suspensions.

According to the invention, a vehicle suspension comprises a beam axle for supporting a pair of ground wheels, a pair of arms arranged to locate the beam axle for movement about an axis spaced forward therefrom and substantially parallel thereto, a bridge member interconnecting the arms and arranged between the beam axle and said axis, link means interconnecting the bridge member and the beam axle for controlling the degree of movement of the beam axle about an axis running fore-and-aft of the vehicle.

Preferably, said link means comprises a rigid extension of the beam axle having its longitudinal axis extending substantially fore-and-aft of the vehicle, the extension being attached to the bridge member by means of a resilient mounting.

Desirably, said resilient mounting incorporates a suitable degree of torsional rigidity to provide the required degree of resistance to said movement of the beam axle about said axis running fore-and-aft of the vehicle.

Conveniently, each of said arms is pivotally connected at one end thereof to one end of the beam axle and at the remaining end thereof to the vehicle body.

Preferably said bridge member is attached at its ends to the arms by resilient mountings. Desirably the resilient mounting on each arm is located substantially midway between the pivotal connections at the two ends thereof.

The vehicle suspension may be arranged at the rear of the vehicle and the beam axle may be arranged to drivably interconnect the ground wheels mounted at each end thereof by means of half-shafts and differential drive transmission gearing enclosed therein.

Conveniently an input shaft to said differential drive transmission gearing is enclosed within said rigid extension of the beam axle for connection to a torque transmission shaft arranged to transmit drive from a vehicle-mounted prime mover.

Desirably there is provided a transverse link attached at one end thereof to an end of the beam axle and at an opposite end thereof to the vehicle body for locating the beam axle laterally with respect to the vehicle body.

Preferably the transverse link is attached at its ends by means of pivotal connections to accommodate movement of the beam axle about an axis running fore-and-aft of the vehicle at substantially the same height as the pivotal connection of the transverse link to the vehicle body.

Preferably rotation of each arm about its pivotal connection with the vehicle body is controlled by a coil spring arranged between the end of the arm adjacent the beam axle and the vehicle body.

Preferably a telescopic damper unit is arranged operatively between each end of the beam axle and the vehicle body.

Figure 2B:
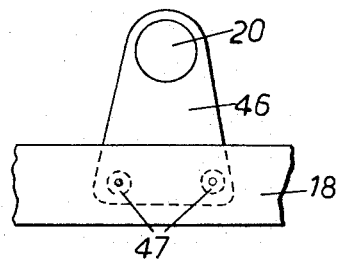

There now follows a description of a particular embodiment of the invention, by way of example, with reference to the accompanying drawings, in which;

FIG. 1 shows in outline a general perspective view of a vehicle rear suspension, and FIGS. 2a and 2b show alternative mounting arrangements for use in the suspension shown in FIG. 1.

Referring to FIG. 1, a pair of coaxial ground wheels 50 are mounted at the ends of a beam axle assembly 22 which has an integral central casing which houses differential drive transmission gearings. The ground wheels 50 are drivably connected through the differential to a shaft 41 running in a direction fore-and-aft of the vehicle body (not shown). This shaft 41 is located within a forward extension of a nose casing 21 for the differential. Power drive for the ground wheels 50 is transmitted from a vehicle-mounted prime mover (not shown), typically an internal combustion engine, through a propeller shaft (not shown) connected to a flange 40 on the shaft 41.

A bracket 28 is rigidly attached to each end of the beam axle 22 just inboard of the ground wheels 50 and to these brackets are pivotally connected the rearward ends of a pair of trailing arms 17. the arms are attached at their forward ends to the vehicle body by pivotal links 31 and thus each arm is constrained to swing in a substantially vertical plane about a transverse axis parallel to the wheel axes. The trailing links 17 are interconnected by a transverse bridge member 18 each end of which is attached to a trailing arm 17 by a resilient mounting 32 located approximately mid-way between the pivots 31 and 33. This bridge member 18 also serves to locate the nose extension 20 by means of a resilient mounting 36 received within a bracket 23 integral with the nose extension 20. The resilient mounting 36 includes a bush held by means not shown at a point approximately mid-way along the length of the bridge arm 18.

Coil springs, indicated by outlines 30, are arranged to act between the vehicle body and the rearward ends of the trailing arms just forward of the beam axle 22. These springs 30 act in a well-known manner to absorb shocks which would otherwise be transmitted from the ground wheels 50 directly to the vehicle body. In addition, a pair of telescopic dampers 26 are connected between the ends of the beam axle 22 and the vehicle body. These dampers are employed to damp out oscillations which might otherwise be set up by the shock-absorbing action of the coil springs 30, and to control the motion of the entire vehicle body.

The ground wheels 50 are located laterally with respect to the vehicle body by a transverse link 14, pivotally connected at 34 to an upper bracket 24 itself rigidly attached to one end of the axle casing 22. the other end of the transverse link is pivotally connected at 35 to the vehicle body.

The resilience of the mountings 32 locating the bridge arm 18 is such as to accommodate a degree of relative movement of the trailing arm 17 about their respective pivots 31 and thus the ground wheels may move in a controlled substantially vertical direction with a certain degree of independence. However, relative vertical travel of the ground wheels 50, assuming them to be in contact with the ground, results in roll of the vehicle body about an axis perpendicular to the wheel axes and running in the fore-and-aft direction. A certain degree of such vehicle body roll may be desirable and is in fact controlled by the torsional stiffness of the resilient mounting 36 which takes the form of a rubber bush and serves to locate the nose extension 20 with respect to which the ground wheels 50 are fixed. The same torsional stiffness that inhibits roll has the desirable effect of limiting the degree of independent movement of the wheels on the rear axle.

In FIG. 2a an altenative mounting arrangement for the nose extension 20, includes a housing 45 which is rigidly attached to the bridge member 18 and receives a hollow generally cylindrical resilient bush 44 through which is located the nose extension 20. This bush 44 is much larger than the bush employed in the arragement shown in FIG. 1 and may have a higher torsional stiffness providing increase roll resistance for the axle casing 22 relative to the vehicle body.

In FIG. 2b a further alternative mounting arrangement for the nose extension 20 includes a bracket 46 rigidly attached therto and located on the bridge member 18 by means of two spaced rubber bushes 47. The spacing and resilience of these bushes 47 determines the torsional stiffness of the arrangement and as before the roll characteristics of the coaxial ground wheels 50.

The characteristics of the rubber material used in the various forms of resilient mounting 36 may be such that a certain degree of damping, in addition to torsional stiffness, may be incorporated in the mounting 36. Thus any tendency for the direction of roll to be successively reversed upon restoration of the ground wheels 50 to the "no-roll" position may be inhibited by virtue of energy dissipated in the rubber material.

The various pivotal connections, typically taking the form of flexible pin-joints or ball joints, employed in the suspension are widely spaced and can if required include rubber bushes to provide a suitable degree of resilience and elasticity without adversely affecting the suspension geometry.

The vehicle suspension described also serves to inhibit angular deflection of the axle casing 22 resulting from the reaction thereon to torque applied to the shaft 41 through the propeller shaft (not shown). The effect of this torque reaction would otherwise be to turn the axle casing 22 about the fore-and-aft axis of the vehicle thus producing to a small extent a similar condition to roll of the vehicle body relative to the ground wheels 50. Furthermore the reaction upon the axle casing of torque applied through the differential to each ground wheel 50 tends to turn the axle casing 22 about the rear trailing arm pivots 33. This tendency is inhibited by the resilient mounting 36 between the axle nose extension 20 and the bridge member 18.

The trailing arms 17 serve primarily to locate the ground wheels in the fore-and-aft direction and it is they which withstand the main forces generated during braking and acceleration of the vehicle. During these latter conditions the forces applied by the ground wheels 50 to the ground produces a generally horizontal reaction force on the ground wheels themselves. The only external forces acting on the vehicle as a whole are its weight, which can be considered to act at its centre of gravity and the reaction forces at the wheels, which, by well-known mechanical laws, can be translated to act at the centre of gravity with the addition of a couple acting about the centre of gravity. The horizontal components of the reaction forces effect a change in momentum of the vehicle viz. Either reducing or increasing its velocity and the couples tend to turn the vehicle about its centre of gravity resulting in a redistribution of the loads on front and rear wheel pairs. During, say, braking, the net effect is for the front suspension to be subjected to an increased load and for the rear suspension to be relieved of its load. The reverse, of course, occurs during acceleration of the vehicle. Thus during braking there is a tendency for the vehicle to dive or tilt downwards at the front. With the arrangement of trailing arms and transverse bridge member previously described the reaction of braking forces applied at the rear wheels acts to compress the rear suspension springs thereby offsetting the extension of the rear suspension spring due to the load transfer from the rear to the front suspension. In this way tilt of the vehicle during braking and acceleration is significantly reduced.

I claim:
1. A vehicle suspension for a vehicle body comprising:
   a. a beam axle for supporting a pair of ground wheels,
   b. a pair of substantially parallel arms, each of the pair being pivotally connected at one end to one end of the axle and pivotally connected at the other end to the vehicle body, said arms serving to locate said beam axle for movement about an axis spaced forwardly of, and parallel to, the axle,
   c. a bridge member interconnecting, and carried by, said arms, the bridge member being parallel to, and intermediate, the axle and said axis,
   d. a link member interconnecting said bridge member and the axle and including a resilient coupling between it and said bridge member for controlling the degree of movement of the axle about an axis extending fore and aft of the vehicle.

2. A vehicle suspension as claimed in claim 1 characterized in that the link member copmrises a rigid extension of the beam axle, said link member having its longitudinal axis extending fore and aft of the vehicle.

3. A vehicle suspension as claimed in claim 2 characterized in that the resilient coupling incorporates sufficient torsional rigidity to provide the required degree of resistance for controlling the degree of movement of the axle about said axis running fore and aft of the vehicle.

4. A vehicle suspension as claimed in claim 2 characterized in that the rigid extensionn forms at least part of a housing for a differential drive transmission gearing arranged to transmit drive from a vehicle-mounted prime mover to ground wheels adapted to be carried by the beam axle.

5. A vehicle suspension as claimed in claim 2 characterized in that said beam axle and bridge member are parallel, and said link member is coupled to said bridge member midway of the latter.

6. A vehicle suspension as claimed in claim 1 characterized in that the bridge member is attached to the arms by resilient mountings.

7. A vehicle suspension as claimed in claim 1 characterized in that said beam axle is adapted to drivably interconnect a pair of ground wheels by means of half shafts and a differential drive transmission gearing housed within the axle.

8. A vehicle suspension as claimed in claim 1 characterized in that a transverse link is provided pivotally attached at one end thereof to said beam axle and is pivotally attached at the other end to the vehicle body to thereby position the axle laterally with respect to the vehicle body.

9. A vehicle suspension as claimed in claim 8 characterized in that the transverse link is pivotally attached to the axle at substantially the same height as the link is pivotally attached to the vehicle body with the vehicle at rest.

* * * * *

PO-1050
(5/69)

UNITED STATES PATENT OFFICE
CERTIFICATE OF CORRECTION

Patent No. 3,768,584      Dated October 30, 1973

Inventor(s) Charles Spencer King

It is certified that error appears in the above-identified patent and that said Letters Patent are hereby corrected as shown below:

[30] Foreign Application Priority Data

July 15, 1970 - Great Britain - 34232/70

Signed and sealed this 8th day of October 1974.

(SEAL)
Attest:

McCOY M. GIBSON JR.
Attesting Officer

C. MARSHALL DANN
Commissioner of Patents